United States Patent [19]

Baugh et al.

[11] Patent Number: 5,815,553
[45] Date of Patent: Sep. 29, 1998

[54] APPARATUS FOR VOICE COMMUNICATION OVER LOCAL AREA NETWORKS

[75] Inventors: Walter T. Baugh, Ellisville, Miss.; Desmond Morris, Huntsville; Francis C. Wessling, III, Madison, both of Ala.

[73] Assignee: McDonnell Douglas Corporation, Huntington Beach, Calif.

[21] Appl. No.: 720,859

[22] Filed: Oct. 2, 1996

[51] Int. Cl.⁶ .................................................. H04M 1/64
[52] U.S. Cl. ...................... 379/88; 379/90.01; 370/429; 370/412
[58] Field of Search ................... 379/67, 88, 89, 379/91.01, 91.02, 90.01, 90.02; 370/389, 352, 412, 428, 429

[56] References Cited

U.S. PATENT DOCUMENTS

| | | | |
|---|---|---|---|
| 5,325,423 | 6/1994 | Lewis | 379/90 |
| 5,341,374 | 8/1994 | Lewen et al. | 370/62 |
| 5,428,636 | 6/1995 | Meier | 379/221 |
| 5,572,677 | 11/1996 | Luther et al. | 395/200.04 |
| 5,625,675 | 4/1997 | Katsumaru et al. | 379/89 |

OTHER PUBLICATIONS

Inexpensive Multimedia Facility for Workstation, IBM Technical Disclosure Bulletin, vol. 38 No. 8 Aug. 1995 pp. 415–417.

*Primary Examiner*—Fan S. Tsang
*Attorney, Agent, or Firm*—Harness Dickey & Pierce P.L.C.

[57] ABSTRACT

An apparatus for transmitting and receiving spoken utterances over a local area network (LAN) in near-real-time. The type of LANs include both wireless LANs (e.g., radio frequency LANs) and wired LANs (e.g., a Novell network). A User depresses computer mouse buttons to initiate or terminate speaking into a computer which contains a sound card, microphone and speakers. The computer mouse buttons generate messages which are monitored by a hibernating process. Upon receiving the appropriate messages, the hibernating process awakens to transmit to one or more selected users. With only a slight time delay, one or more selected remote users receive the recorded message. Two buffers provide an efficient transfer mechanism of the recorded message between the transmitting and the receiving computers. Also, encryption techniques provide security measures for the transmitted recorded measures and compression techniques assist in the transfer of the recorded message.

11 Claims, 13 Drawing Sheets

| TIME ELAPSED IN SECONDS (160) | USER ACTION (162) | ACTION CARRYED OUT BY VOICELAN ON LOCAL COMPUTER (164) | RECORDER & DATA SEGMENTER (166) | CONTENT OF BUFFER 1 (168) | CONTENT OF BUFFER 2 (170) | RECORDED SEGMENT SAVED ON REMOTE COMPUTER (172) | ACTION CARRYED OUT BY VOICELAN ON REMOTE COMPUTER (174) | UTTERANCE PLAYED ON REMOTE COMPUTER (176) |
|---|---|---|---|---|---|---|---|---|
| 1 | PUSH DOWN RIGHT MOUSE BUTTON AND BEGIN SPEAKING INTO THE MICROPHONE SAYING "HELLO, THIS IS BOB CALLING HARRY ARE YOU THERE" | STARTS RECORDING SYSTEM TO FILL BUFFER ONE | RECORDS INPUT SOUND TO BUFFER ONE | "HELLO, THIS IS" | | | | |
| 2 | | STOPS RECORDING TO BUFFER ONE AND BEGINS RECORDING TO BUFFER TWO | RECORDS INPUT SOUND TO BUFFER TWO | | BOB CALLING | CONTENTS OF SEGMENT 1 (HELLO, THIS IS) | START PLAYBACK DEVICE FOR RECEIVED SEGMENT 1 | "HELLO, THIS IS" |
| 3 | | STOPS RECORDING TO BUFFER TWO AND BEGINS RECORDING TO BUFFER ONE | RECORDS INPUT SOUND TO BUFFER ONE | HARRY ARE | | CONTENTS OF SEGMENT 2 (BOB CALLING) | START PLAYBACK DEVICE FOR RECEIVED SEGMENT 2 | BOB CALLING |
| 4 | | STOPS RECORDING TO BUFFER ONE AND BEGINS RECORDING TO BUFFER TWO | RECORDS INPUT SOUND TO BUFFER TWO | | YOU THERE" | CONTENTS OF SEGMENT 1 (HARRY ARE) | START PLAYBACK DEVICE FOR RECEIVED SEGMENT 3 | HARRY ARE |
| 5 | STOPS TALKING AND RELEASES RIGHT MOUSE BUTTON | STOPS RECORDING TO BUFFER TWO | STOP RECORDING | | | CONTENTS OF SEGMENT 2 (YOU THERE) | START PLAYBACK DEVICE FOR RECEIVED SEGMENT 4 | YOU THERE" |

FIG 2B

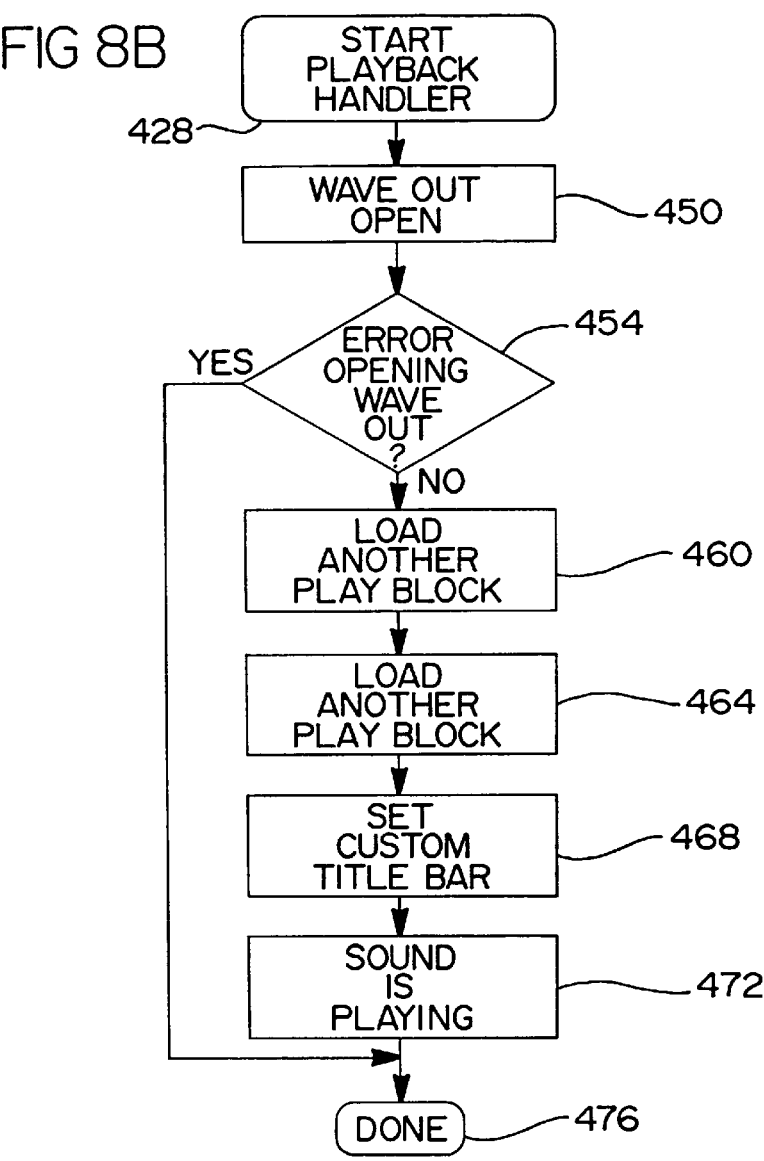
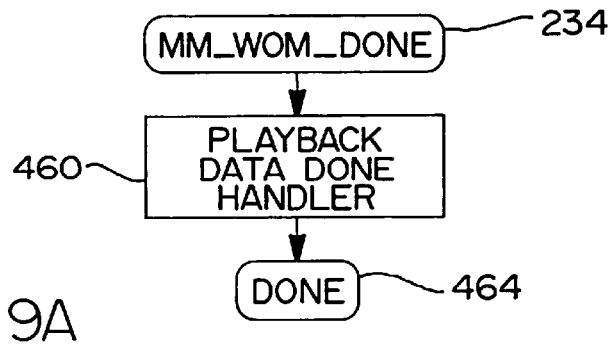

APPARATUS FOR VOICE COMMUNICATION OVER LOCAL AREA NETWORKS

The U.S. Government has a paid-up license in this invention and the right in limited circumstances to require the patent owner to license others on reasonable terms as provided for by the terms of contract DAAK 60-95-C-2029 awarded by the U.S. Army.

BACKGROUND OF THE INVENTION

1. Field of the Invention

The present invention relates generally to computer network communications and more particularly to voice communication over a local area network.

2. Discussion

Previous systems which provided spoken messages to be transmitted between two computer across a local area network (LAN) were not able to deliver the spoken messages in real-time. Rather, the previous systems operated in a batch mode capacity. These type of voice communication systems recorded an entire spoken message and then play that entire spoken message back at the receiver, although with a substantial time delay between the recording of the message and the playing back.

In addition, encrypted voice is required for some applications which typically required the acquisition, installation, configuration, and use of expensive dedicated encryption equipment.

SUMMARY

The present invention transmits in near-real-time spoken utterances between a first and second computer (or networked group of computers) over a computer communication medium. The computer communication medium communicates digital data which includes spoken digital data and non-spoken digital data. The first computer has a recorder for recording the spoken utterances. The second computer has a playback device for playing back the transmitted spoken utterances.

The present invention includes a recorder controller coupled to the recorder for controlling the digitally recording of the spoken utterances into spoken data by the recorder. A data segmenter coupled to said recorder populates spoken data segments with the spoken data. The spoken data segments are of a predetermined length. A transmitter coupled to the data segmenter and to the computer communication medium transmits the spoken data segments between the first computer and the second computer over the computer communication medium. The transmitter transmits a spoken data segment after the spoken data segment has been populated to the predetermined length with the spoken data.

A receiver coupled to the second computer and to the computer communication medium receives the transmitted spoken data segments. A playback controller coupled to the playback device controls the playing back of the transmitted spoken data segments. The playing back of the spoken data segments are substantially in near-real-time from the transmitting of the spoken data segments.

The present invention could be used as a stand-alone to provide voice LAN communications for a variety of applications, including military, industrial, commercial, academic, and personal. Another possible use of the system is for transmitting, processing, and displaying, with a small time delay, moderate data-rate signals, such as radar or data-link information, provided that the signals are properly conditioned with respect to the sound card inputs and outputs.

BRIEF DESCRIPTION OF THE DRAWINGS

Additional advantages and features of the present invention will become apparent from the subsequent description in the appended claims, taken in conjunction with the accompanying drawings in which:

FIGS. 8A–8C are operational flow diagrams showing the operations performed upon receipt of a WM_USER message;

FIGS. 9A–9B are operational flow diagrams showing the operations performed upon receipt of a MM_WOM_DONE message.

DESCRIPTION OF THE PREFERRED EMBODIMENTS

Figure 1:
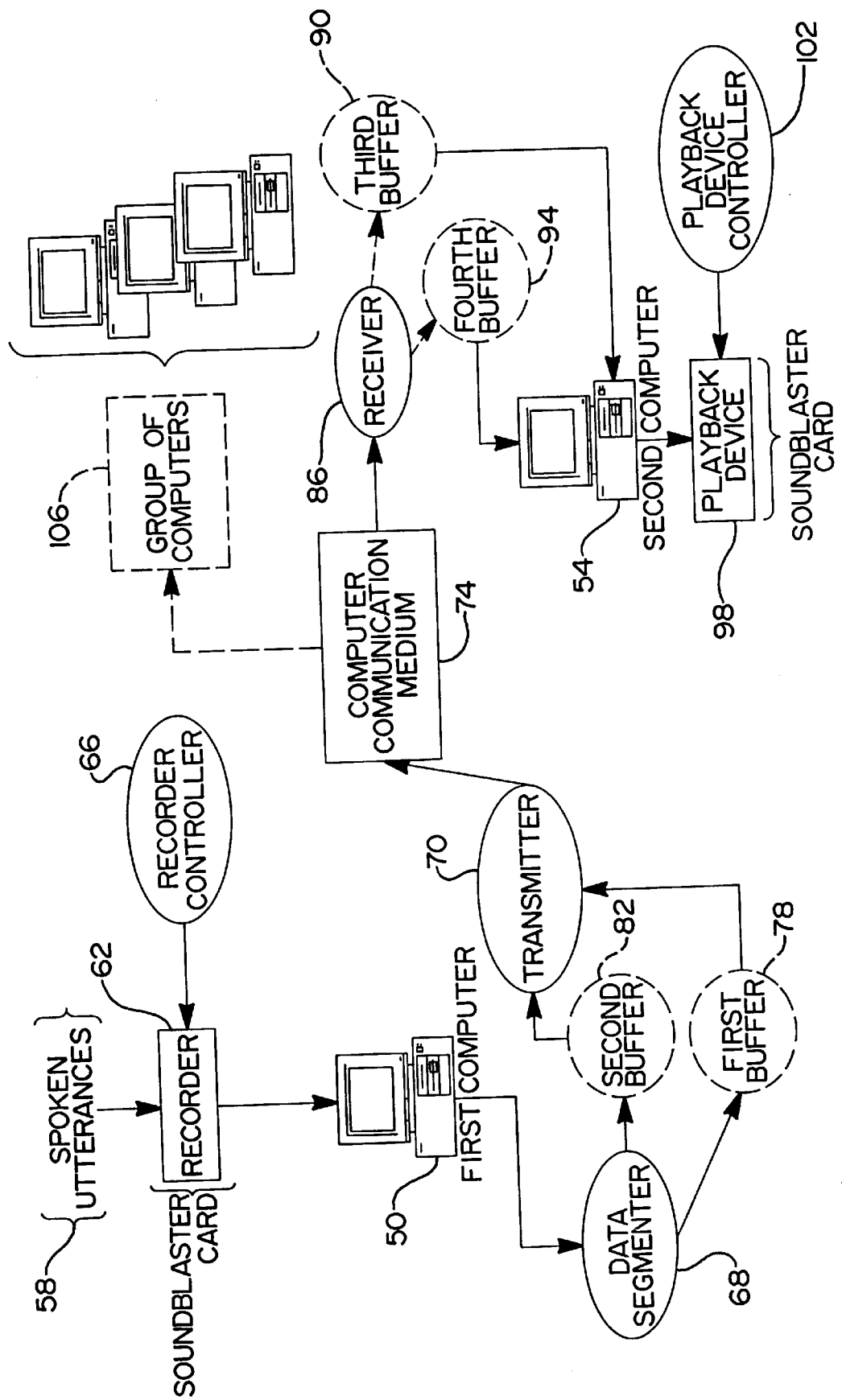
FIG. 1 is an entity relationship diagram showing the inner connections among the components of the voice communication system.

FIG. 1 is an entity relationship diagram showing the interrelationships among the components of a voice computer communication system. A user operating on a first computer 50 can record a message and send it to another person who is operating on a second computer 54. The person on the second computer 54 can hear the recorded message with only a slight delay of time between the recording and playing back of the message. If for example, the time delay were set to one second, and the utterance was ten seconds in duration, the recipient would hear most of the utterance before the speaker had finished.

The user on the first computer 50 utters spoken utterances 58 into a recorder 62. For the preferred embodiment, the recorder 62 includes a microphone and a Sound Blaster card with its associated software drivers located within the first computer 50.

The user uses a recorder controller 66 to control the recorder 62. The functions of the recorder controller 66 include starting the recorder 62 and stopping the recorder 62. A data segmenter 68 segments the spoken utterances 58 as they are being recorded into data segments. The preferred embodiment segments the spoken utterances 58 into data segments of one-half second duration. As an utterance fills up a data segment, the data segment is sent to the second computer 54.

Specifically, the data segmenter 68 segments the spoken utterances 58 and stores the resultant data segment in a first buffer 78. If the spoken utterances 58 fills up the first buffer, the data segmenter 68 begins storing the next data segment in a second buffer 82. After the first buffer 78 has been filled up, transmitter 70 places the data segment which was stored within the first buffer 78 onto a computer communication medium 74 (such as a phone line optical line, ISDN line or wireless microwave/RF) with the ultimate destination being specified. After the data segment which had stored in the first buffer 78 has been transmitted by the transmitter 70, then the first buffer 78 is available to store another data segment from the data segmenter 68. Likewise, after the data segment which had stored in the second buffer 82 has been transmitted by the transmitter 70, then the second buffer 82 is available to store another data segment from the data segmenter 68. In this way, the data segmenter 68 "ping-pongs" the storage of data segments between the first buffer 78 and the second buffer 82. This approach allows the transmission of portions of the spoken utterances 58 before a user may actually have finished recording his message.

Within the art of the present invention, the terms "segments" and "slices" are interchangeable. Moreover, the preferred embodiment uses data structures as buffers to hold the data segments. It is to be understood that the preferred embodiment is not limited to only this implementation, but entails others such as files to hold the data segments.

A receiver 86 on the second computer 54 receives a transmitted data segment from the computer communication medium 74 and places it into a third buffer 90. When the capacity of the third buffer 90 is substantially full, the receiver 86 places the next data segment into a fourth buffer 94. As soon as the third buffer 90 becomes filled, the data segment is transferred to a play back device 98 which is located on the second computer 54. Thereupon the third buffer 90 is available for the receiver 86 to place any additional transmitted data segments into it.

Likewise, as soon as the fourth buffer 94 becomes filled, the data segment is transferred to a play back device 98 which is located on the second computer 54. Thereupon the fourth buffer 94 is available for the receiver 86 to place any additional transmitted data segments into it. In this way the receiver 86 "ping-pongs" between the third buffer 90 and the fourth buffer 94 for storing the transmitted data segments. For the preferred embodiment, the play back device 98 is a speaker connected to a Sound Blaster card.

It is to be understood that the present invention is not limited to only two buffers for the first computer 50 and the second computer 54 for the storing of data segments, but may include any number of buffers which substantially performs the "ping-ponging" storing operation.

Operating on the second computer 54, a play back device controller 102 controls the operations of the play back device 98. The functions of the play back device controller 102 include notification of an incoming message and starting and stopping the playback of each recorded data segment. The playing back of a spoken utterance occurs only with a slight time delay. If, for example, the time delay were set to one second, and the utterance was ten seconds in duration, the recipient would hear most of the utterance before the speaker had finished. Moreover, the transmitting and receiving of spoken data across the computer communication medium 74 does not interfere with the transmittal and receiving of non-spoken data across the computer communication medium 74. The voice computer communication system, therefore, does not conflict with the traditional usage of local area networks. The non-conflict situation arises since the transmission of digitized voice packets is interleaved with the regular data transmitted across the network.

The computer communication medium 74 provides hand shaking and traffic functions for transferring the spoken data between transmitter 70 and receiver 86. For the preferred embodiment, the computer communication medium 74 is a wireless local area network (LAN), such as an radio frequency (RF) wireless LAN as provided by Digital Equipment Corporation (DEC).

For the preferred embodiment, the aforementioned computers are personal computers capable of operating Windows 95. Moreover, each personal computer has an input device, namely a mouse, to use as a push-to-talk switch. These components provide a capability similar to that provided by traditional RF voice methods (i.e. "walkie-talkies"), without the dedicated RF components. For a second embodiment, the keyboard can be used as another input device.

The transmitter 70 can also more fully utilize the capability of the computer communication medium 74 to include transmittal of the spoken data to more than one computer. For example, the first computer 50 can transmit spoken data across the computer communication medium 74 to a group of computers 106. For the preferred embodiment, all computers on the communication medium have the software necessary to do the functions of the recording, transmitting, receiving and playing back the voice data segments.

For the preferred embodiment, the voice computer communication system operates within a Microsoft Windows software system which can be integrated into any properly prepared Windows application at the source level. The preferred embodiment also includes operation on a Microsoft Windows 95 operation system. However, it is to be understood that the present invention is not limited to the Windows environment. Other similar environments are also included within the present invention, such as the Apple Macintosh operating environment or UNIX-based platforms.

Figure 2:
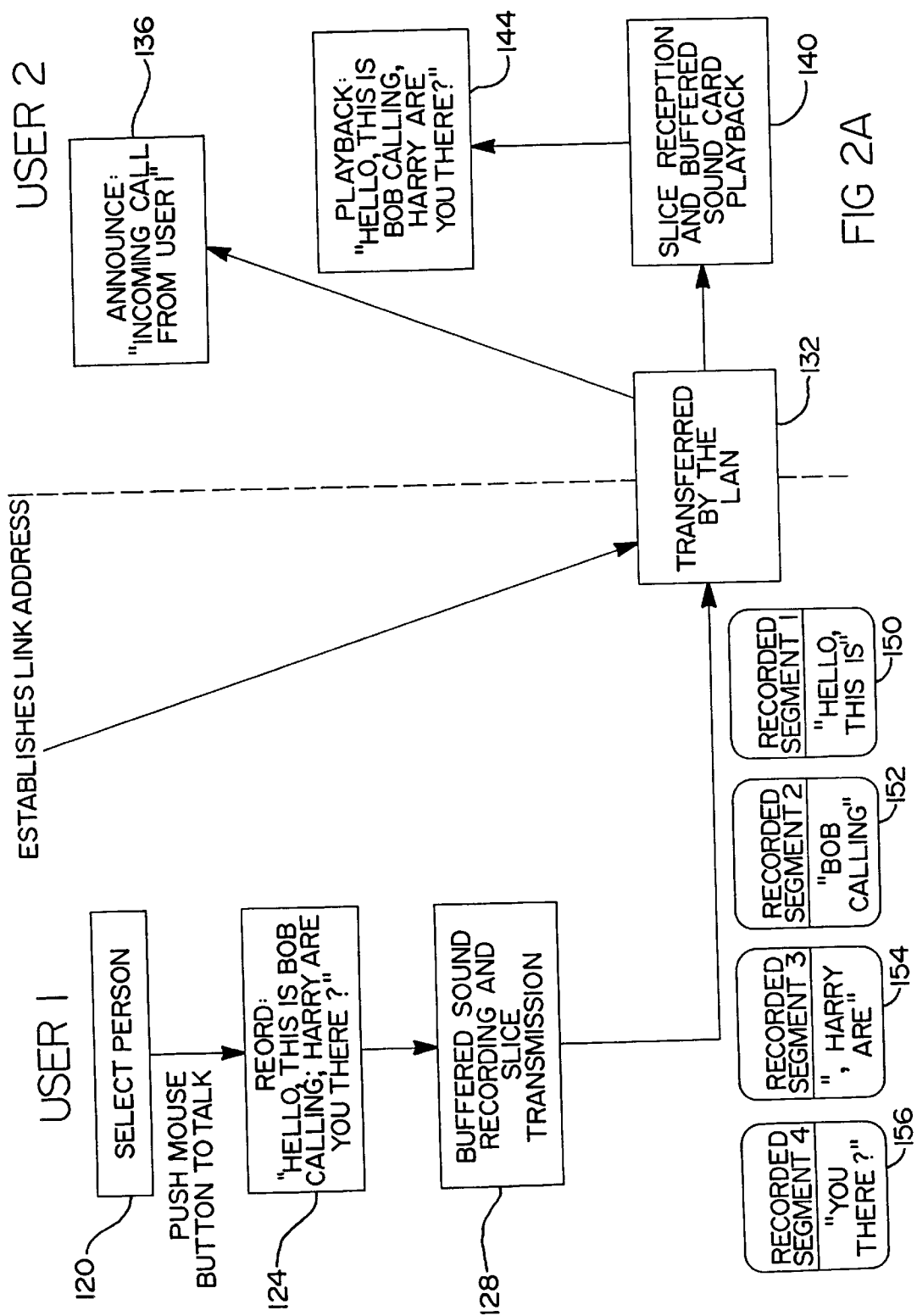
FIG. 2A is a top-level flow block diagram illustrating the steps for recording and playing back a message.
FIG. 2B is a timeline block diagram showing the operations of the present invention at various points in time.

FIG. 2A is a top-level flow diagram showing the flow of operations in using the voice computer communication system. For user one to communicate with user two who is operating another computer, user one would select the person with whom user one wishes to communicate as shown in block 120. User one then pushes a mouse button to record a message as shown in block 124. At block 128, there is a buffered sound recording and slice transmission of the recorded message across the LAN 132. The buffered sound recording refers to the filling sequence of the first and second buffer with the digitized voice message. Slice transmission refers to splitting/segmenting the voice message into discrete packets for transmission of the voice data over the network. Moreover, the voice computer communication system establishes the link address necessary for communicating the recorded message to user two. The link address refers to the identification tag for a given computer (user) The computer of user two receives the transmitted message and announces at block 136 that there is an incoming call from user one. Meanwhile, block 140 performs slice reception and buffered sound card playback operations upon the transmitted message. The slice reception refers to receiving the discrete digitized voice message packets. The buffered sound card playback operations refer to reconstructing the slices into a coherent message ready for play back. The execution of block 140 results in the playing back of the transmitted message as shown in block 144.

In FIG. 2A, the user is recording the message "Hello, this is Bob calling; Harry are you there?". While the message is being recorded, Block 128 produces recorded data segments. Due to its length, this message encompasses four recorded data segments and resembles the following: data segment one 150 contains "Hello, this is"; data segment two 152 contains "Bob calling"; data segment three 154 contains"; Harry are"; and data segment four 156 contains "you there?". Each data segment is sent to block 140 as soon as it is filled up with a portion of the message.

FIG. 2B provides an example of a more detailed timeline of the operations for the components of the present invention. For this example, the present invention has been succinctly termed "VoiceLan". Column 160 shows the time elapsed in seconds. Column 162 shows what the user is doing on a local computer in order to send a voice message to another user on a remote computer. Column 164 shows what actions are being done by VoiceLan on the local computer—such as recording the message. Column 166 shows in which buffer the recorder and data segmenter are storing the message. Column 168 shows the contents of buffer 1. Column 170 shows the contents of buffer 2. Column 172 shows the recorded data segment as saved on the remote computer. Column 174 shows the action carried out by the VoiceLan on the remote computer, such as starting the playback of the message. Column 176 shows the time sequence in which the utterance of the message is being played back upon the remote computer. As FIG. 2B shows, the utterance is being played back upon the remote computer before the user on the local computer has completed the message.

Thus, user two does not have to wait until the transmission is complete before hearing the start of the message. The system otherwise represents a unique solution to the problem of providing both voice and data channels among a group of users. Once a group of users has a LAN link established, the voice channel is immediately available, given installed sound cards. The present invention is designed to allow near-real-time voice communications over either a wired or a wireless LAN. This capability allows a single RF channel and set of transceivers to be used for both voice and data in the mobile wireless LAN configuration.

Moreover, the present invention allows the recipient of the message to receive the initial portions of the transmission before the speaker is finished transmitting, which reduces intertransmission delays. Also, this system can be used for encrypted voice, adding security and/or privacy, depending upon the sophistication of the encryption algorithm chosen.

Figure 3:
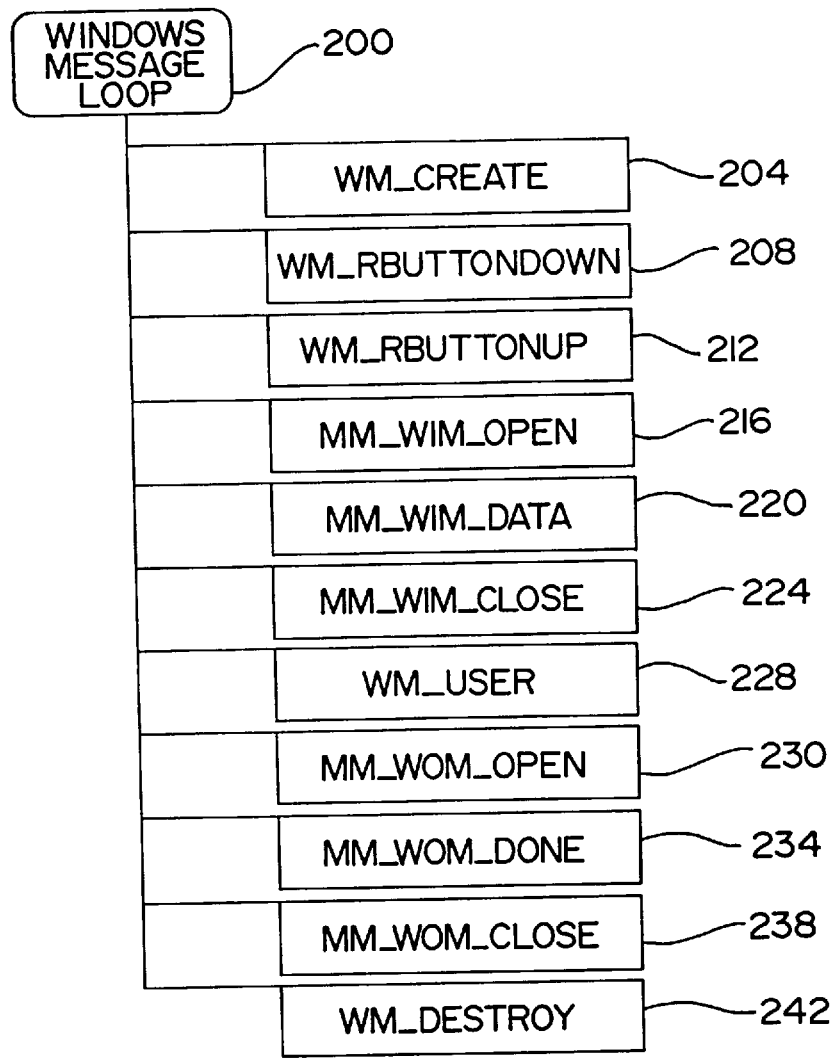
FIG. 3 is an operational flow diagram showing the various messages processed for communicating spoken data between two computers.

As indicated on FIG. 3, the present invention processes eleven Windows messages. As indicated at loop block 200, a Windows Message Loop iteratively checks if any of the predetermined Windows messages has been sent to the computer on which it resides. For the preferred embodiment, the Windows Message Loop is a hibernating process which periodically checks for the following messages: WM_CREATE message 204; WM_RBUTTONDOWN message 208; WM_RBUTTONUP message 212; MM_WIM_OPEN message 216; MM_WIM_DATA message 220; MM_WIM_CLOSE message 224; WM_USER message 228; MM_WOM_OPEN message 230; MM_WOM_DONE message 234; MM_WOM_CLOSE message 238; and WM_DESTROY message 242. When the Windows Message Loop is started, a WM_CREATE message 204 is sent to Windows Message Loop.

Figure 4:
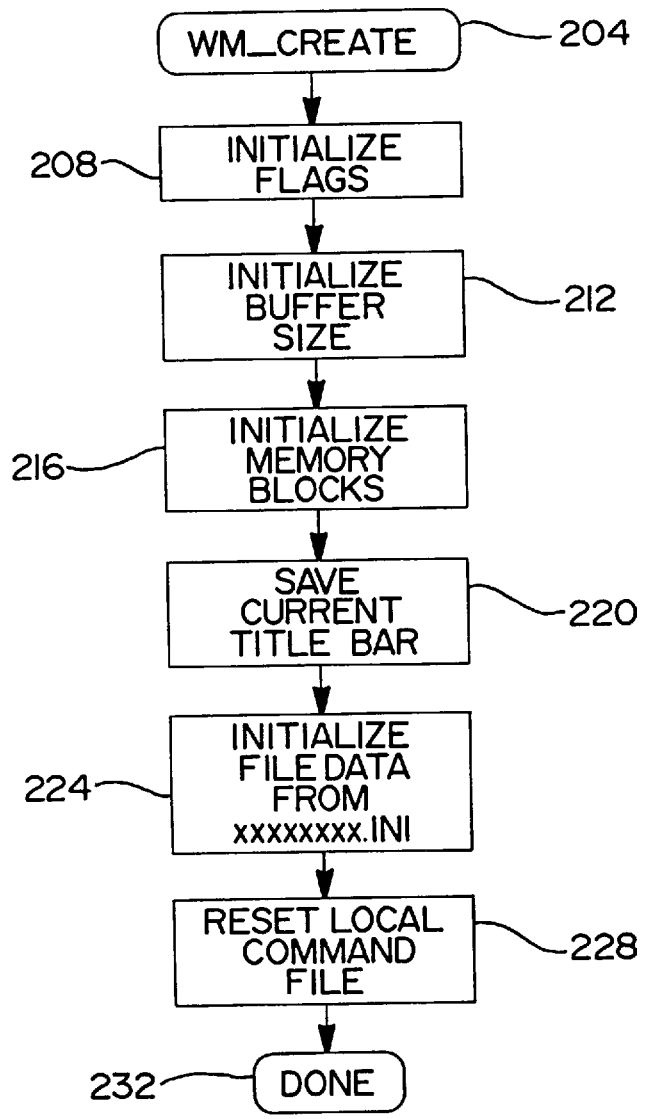
FIG. 4 is an operational flow diagram showing the operations performed upon receipt of a WM_CREATE message.

As shown on FIG. 4, the present invention uses this message as an opportunity to initialize program attributes, such as various flags at block 208, buffers at block 212, and memory blocks at block 216. The current title bar is saved on block 220. Also, the file data from the initialization file for the session is initialized at block 224. The local command file is reset at block 228. This allows a remote transmitter to determine that the system is ready to receive an utterance. Processing for the WM_CREATE message terminates at completion block 232.

Figure 5A:
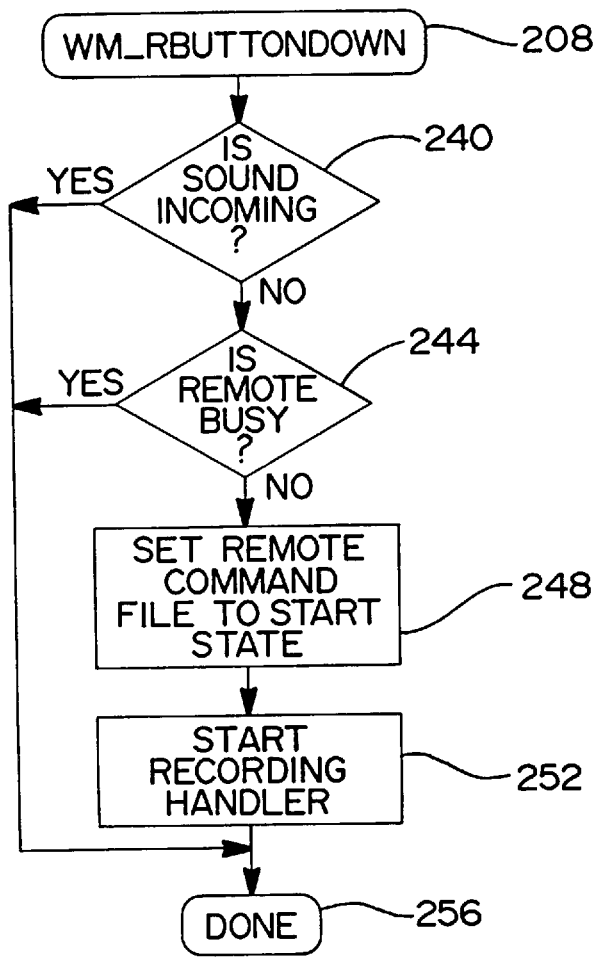
FIGS. 5A–5B are operational flow diagrams showing the operations performed upon receipt of a WM_RBUTTONDOWN message.

When a speaker wishes to transmit an utterance to a recipient, he or she presses the right mouse button, which generates a WM_RBUTTONDOWN message. As shown on FIG. 5A, if the system is not currently processing a playback or recording an utterance as checked at block 240, the present invention checks at decision block 244 to see if the remote computer is not available for voice communication processing. If either decision block 240 or decision block 244 yield a "Yes" determination, then processing terminates at completion block 256. However, if both yield "No" responses, then processing continues at block 248.

At block 248, the remote command file is set to the start state. Setting the remote command file to the start state alerts the remote system that incoming sound data is imminent. This also alerts all other transmitters to the fact that the remote in question is temporarily unavailable for receipt of utterances. The sound system is initialized for recording by starting the recording handler at block 252. Upon completion of block 252, processing terminates at completion block 256.

Figure 5B:
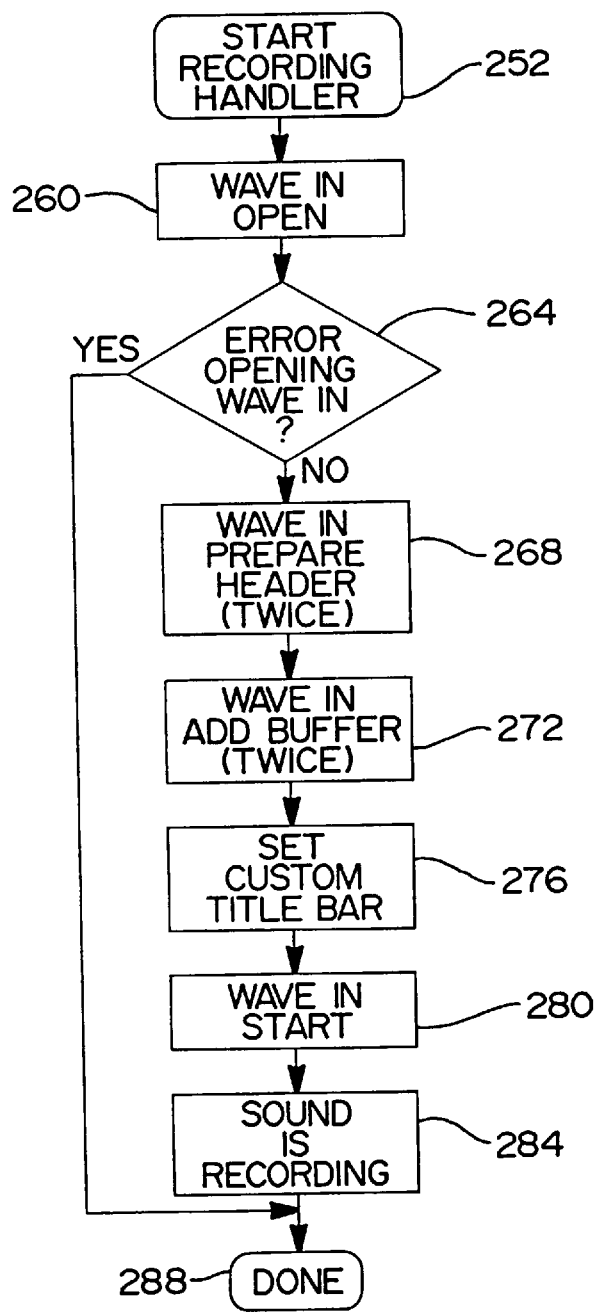

As shown on FIG. 5B, processing of block 252 includes initializing the sound system for recording by opening the WaveIn device at block 260. The WaveIn device refers to a software device class that represents the audio devices in use. If this device is successfully opened as determined at decision block 264, then two sound blocks are prepared and added to the sound system, which is then started. The steps involved in that process include preparing two waveIn headers at block 268 and two waveIn Buffers at block 272. The custom title bar is set at block 276 and the waveIn is started at block 280. At this point, the "SoundIsRecording" flag is set at block 284. Processing terminates at completion block 288. Initializing the sound system for recording automatically generates a MM_WIM_OPEN message which a user can use to perform any additional required functionality.

The user holds the right mouse button down while speaking. Periodically, as sound buffers are filled, the sound system generates MM_WIM_DATA messages.

Figure 6A:
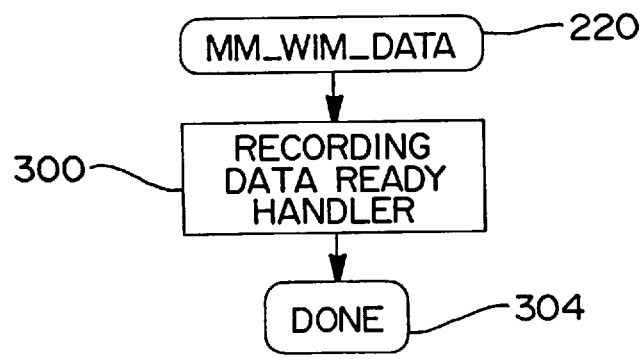
FIGS. 6A–6B are operational flow diagrams showing the operations performed upon receipt of a MM_WIM_DATA message.
Figure 6B:
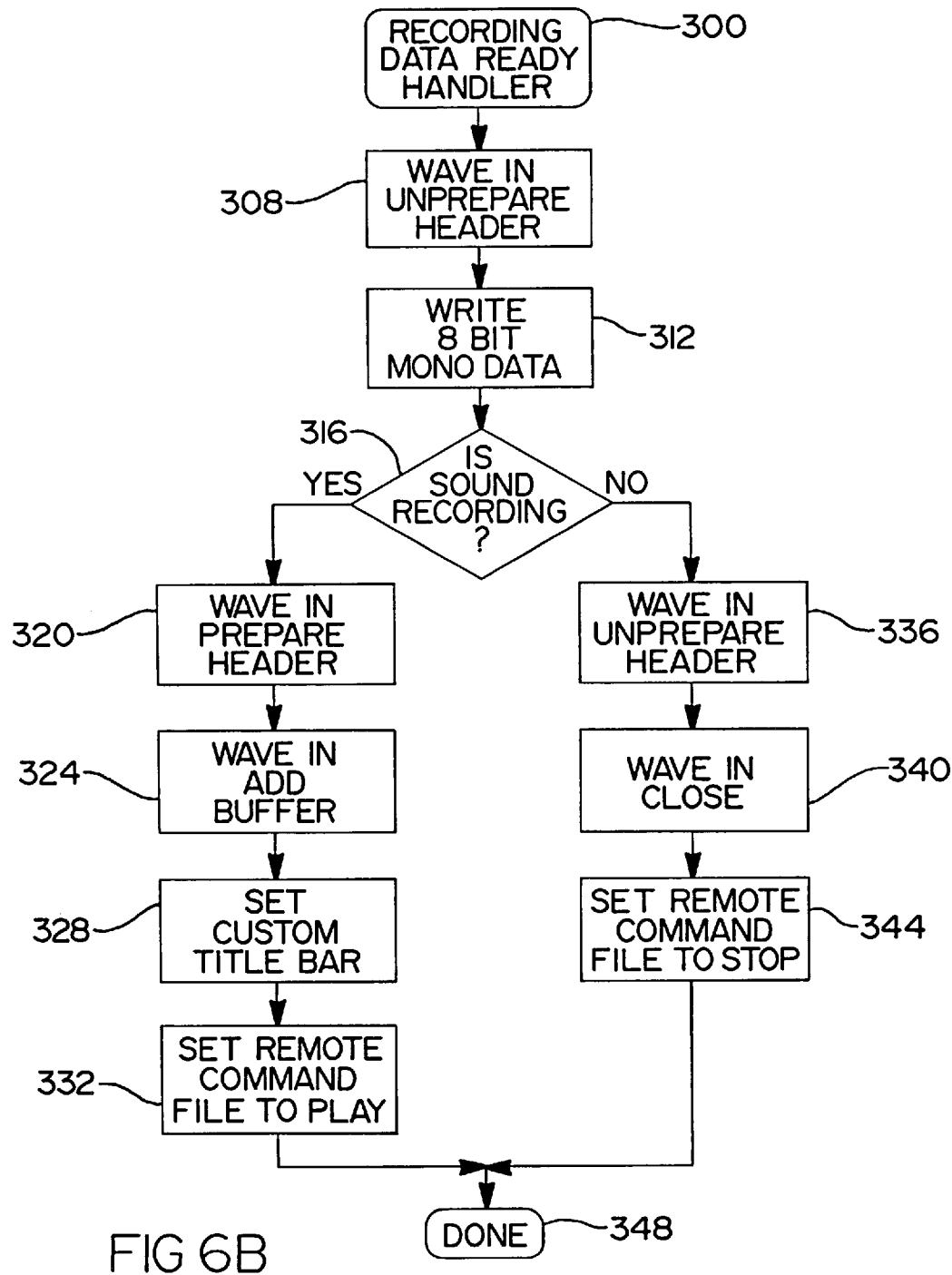

FIG. 6A shows the processing for a MM_WIM_DATA message, the Recording Data Ready Handler is called at block 300 and then processing terminates at completion block 304. As shown on FIG. 6B, the Recording Data Ready Handler (block 300) first removes (unprepares) the data block from the sound system at block 308 and writes the sound block to the remote computer at block 312. If sound is still being recorded as checked at decision block 316, then the handler prepares another sound block and adds it to the sound system. The processing includes preparing a data block for the sound system at block 320 and adding it to the buffer at block 324. The custom title bar is set at block 328. At block 332, the handler then sends a command to the remote computer to play.

If the sound system is no longer recording as checked at decision block 316, then the handler closes the sound system by removing (unpreparing) the data block from the sound system at block 336 and closing the waveIn device at block 340. A stop command is sent to the remote computer at block 344, which stops playback once all transmitted files are exhausted.

As long as the speaker is depressing the right mouse button, the MM_WIM_DATA process is repeated periodically. When the speaker is finished with the utterance, the right mouse button is released. This action generates a Windows WM_RBUTTONUP message.

Figure 7A:
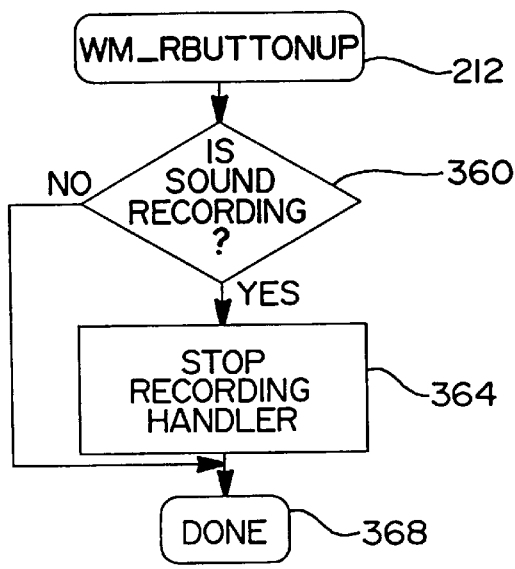
FIGS. 7A–7B are operational flow diagrams showing the operations performed upon receipt of a WM_RBUTTONUP message.

FIG. 7A shows the processing of the WM_RBUTTONUP message 212. If the recording sound flag is set as checked at decision block 360, then the StopRecordingHandler is called at block 364 and the processing terminates at completion block 368.

Figure 7B:
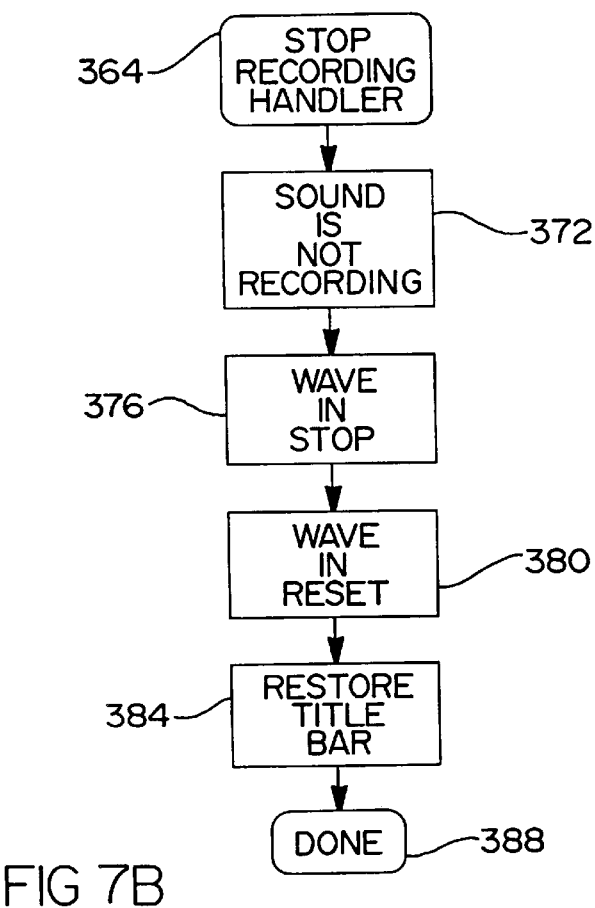

As shown on FIG. 7B, the recording sound flag is cleared at block 372 and the waveIn device is stopped at block 376 and then reset at block 380. The title bar is restored at block 384 whereupon processing terminates at completion block 388.

Stopping and resetting the waveIn device automatically generates MM_WIM_DATA messages for each of the sound blocks remaining in the sound system. As noted above, this ultimately results in the waveIn device being closed. Closing the waveIn device automatically generates a MM_WIM_CLOSE message. The MM_WIM_CLOSE is a message which a user can use to perform any additional required functionality.

As a result of the recording and transmission process, a command file and several voice data files (.WAV) are written to the remote computer. The command file contains a single flag and a counter. The voice data files contain blocks of the recorded sound file in sequence. These files collectively contain all the correct information to properly playback the recorded utterance. A description of the playback process follows immediately below.

Periodically, as a result of the Windows message loop 200, WM_USER messages are generated. These messages provide opportunities to detect and playback incoming utterances. As shown on FIG. 8A, if an utterance is not being recorded as checked at decision block 400 and the local command file is set to either PLAY or STOP as checked by state decision block 404, then the incoming sound flag is set at block 416. If the utterance was not already playing as checked at decision block 420, the playback is started at block 428. If the utterance was already playing then the playback is continued at block 432 whereupon processing terminates at block 436.

If the command file is set to START, the incoming sound flag is set at block 440. If the command file is set to either RESET or UNAVAILABE, then processing terminates at block 436.

As shown on FIG. 8B, the Start Playback Handler (block 428) first opens the waveOut device at block 450. If this device is opened successfully as checked at block 454, the handler loads up to two voice data files into playblocks. The first voice data file is loaded at block 460 and the second at block 464. The custom title bar is set at block 468. The sound playing flag is set at block 472. Thereupon, processing terminates at completion block 476. Opening the waveOut device automatically generates a MM_WOM_OPEN message. The MM_WOM_OPEN is a message which a user can use to perform any additional required functionality.

Figure 8A:
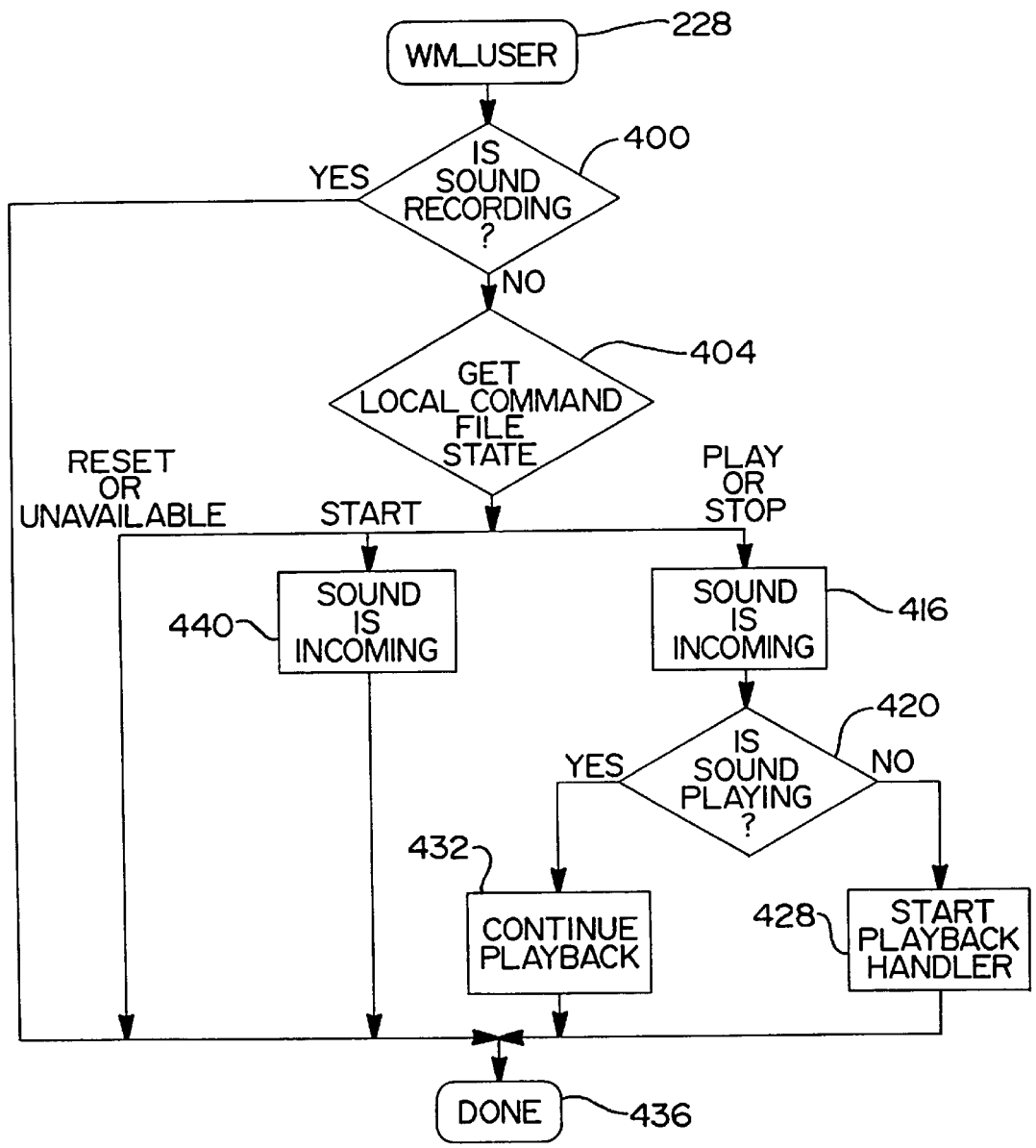
Figure 8C:
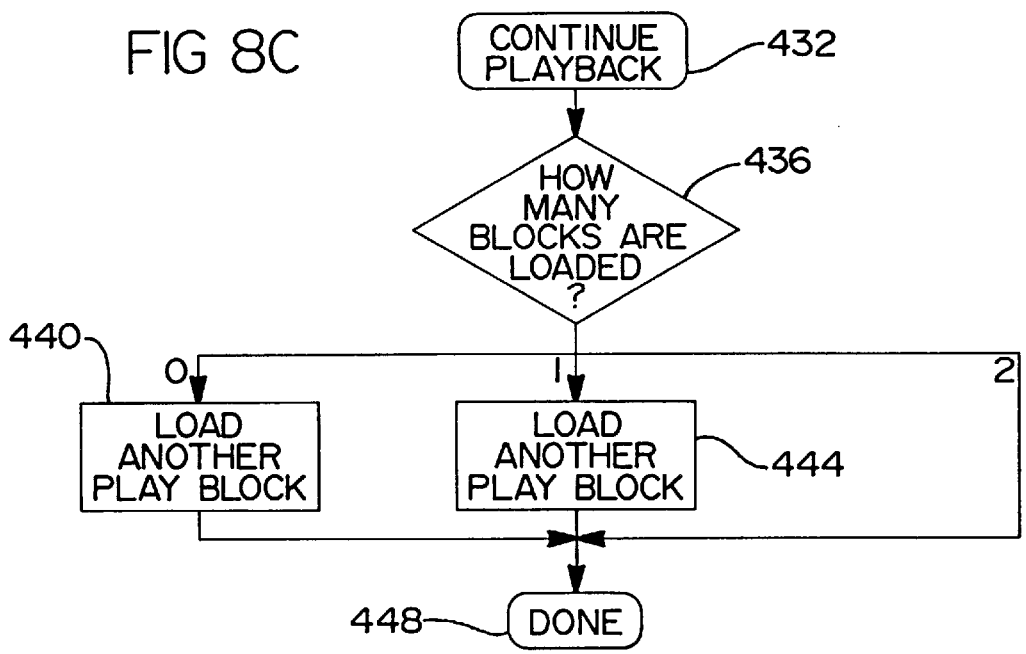

FIG. 8C shows the processing involved in the Continue Playback operations of block 432 of FIG. 8A. Referring to FIG. 8C, if zero blocks are loaded as checked at decision block 436, then another playblock is loaded at block 440, if it has arrived on the disk. If one block is loaded as checked at decision block 436, then another playblock is loaded at block 444, if it has arrived on the disk. If two blocks are loaded, then processing terminates at completion block 448. If not, then processing terminates at completion block 448.

As the sound system exhausts playblocks during playback, MM_WOM_DONE messages are generated. As shown in FIG. 9A, this causes the Playback Data Done handler at block 460 to execute and thereupon processing terminates at completion block 464.

Figure 9B:
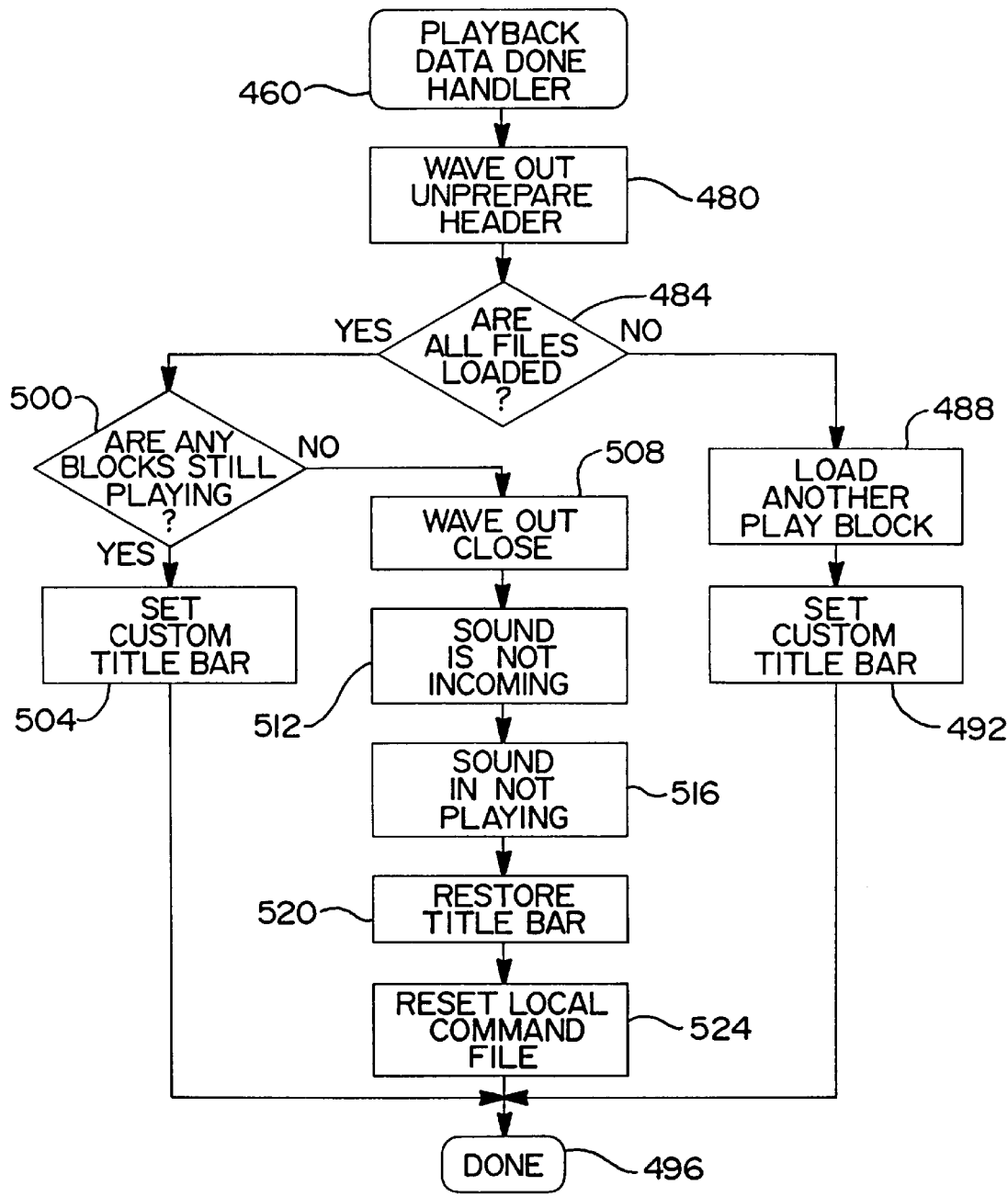

FIG. 9B, shows the processing involved within the Playback Data Done handler at block 460. This handler first removes (unprepares) the exhausted playblock from the sound system at block 480. If all files are not loaded as checked at decision block 484, as detected from examination of the command flag and counter in the local command file, then another playblock is loaded at block 488 and the custom title bar is set at block 492. Processing then terminates at completion block 496.

If all files are loaded as checked at decision block 484, then the system checks whether there are any blocks still playing at decision block 500. If the blocks are still playing, then the custom title bar is set at block 504 and playback continues.

If no blocks are still playing as determined at decision block 484, then the waveOut device is closed at block 508. The incoming sound flag is cleared at block 512, as is the sound playing flag at block 516. Also, the title bar restore flag is reset at block 520. Finally, the local command file is reset at block 524. Closing the waveOut device automatically generates a MM_WOM_CLOSE message. The MM_WOM_CLOSE is message which a user can use to perform any additional required functionality.

Figure 10:
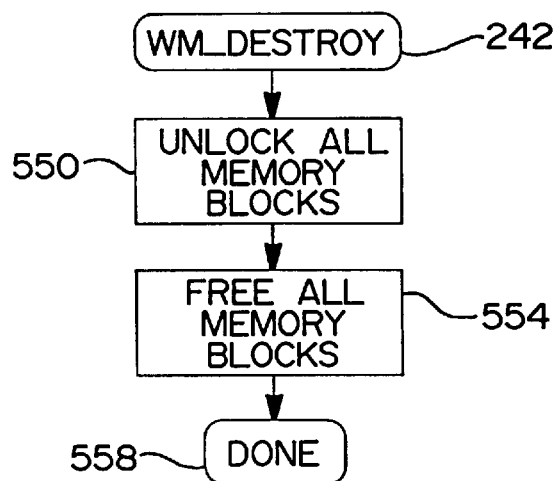
FIG. 10 is an operational flow diagram showing the operations performed upon receipt of a MM_DESTROY message.

At some point, the application is terminated, which generates a WM_DESTROY message. As shown on FIG. 10, the WM_DESTROY message 242 results in all allocated memory blocks being returned to the operating system by unlocking all memory blocks at block 550 and by freeing all memory blocks at block 554. Processing terminates at completion block 558.

The present invention also includes data encryption. For use of data encryption within the present invention, the data is encrypted before writing to the remote voice file and decrypted when the file is read prior to playback.

Furthermore, with respect to the back-and-forth handshaking between computers communicating spoken data, the spoken data packages are transparent to the users. From a user's perspective, conversations are simply push-to-talk events. All of the recording, sequencing, and playback occurs automatically in the background.

The embodiments which has been set forth above was for the purpose of illustration and was not intended to limit the invention. It will be appreciated by those skilled in the art that various changes and modifications may be made to the embodiment described in this specification without departing from the spirit and scope of the invention as defined by the appended claims.

It is claimed:

1. An apparatus for transmitting spoken utterances substantially in real time between a first computer and a second computer over a computer communication medium, said computer communication medium communicating digital data, said digital data including digitized voice data and non-spoken digital data, said first computer having a recorder for recording said spoken utterances, said second computer having a playback device for playing back said transmitted spoken utterances, the apparatus comprising:

a recorder controller coupled to said recorder for turning on and off said recorder to control the digital recording of said spoken utterances into digitized voice data by said recorder;

a data segmenter coupled to said recorder for segmenting said digitized voice data into a plurality of digital data segments of predetermined lengths;

a first buffer and a second buffer each responsive to said data segmenter for storing said digital data segments, said data segmenter causing said first buffer to be completely filled with a first digital data segment before filling said second buffer with a second digital data segment;

a transmitter coupled to said data segmenter and to said computer communication medium for transmitting said digital data segments between said first computer and said second computer over said computer communication medium, said transmitter transmitting said first digital data segment from said first buffer while said second buffer is being filled, and the contents of said second buffer while said first buffer is being filled;

a receiver coupled to said second computer and to said computer communication medium for receiving said transmitted digital data segments; and a playback controller coupled to said playback device for controlling the playing back of said transmitted spoken data segments, said playing back of said spoken data segments being substantially in real time from said transmitting of said spoken utterances.

2. The Apparatus of claim 1 wherein said computer communication medium comprises a local area network.

3. The Apparatus of claim 2 wherein said computer communication medium comprises a wireless local area network.

4. The Apparatus of claim 2 wherein said computer communication medium comprises a wired local area network.

5. The apparatus of claim 2 wherein said transmitter operates to transmit said digitized voice data to a group of computers, said group of computers being connected to said local area network.

6. A method for transmitting substantially in real-time spoken utterances between a first computer and a second computer over a computer communication medium, said computer communication medium communicating digital data, said digital data including digitized voice data and non-spoken digital data, said first computer having a recorder for recording said spoken utterances, said second computer having a playback device for playing back said transmitted spoken utterances, said method comprising the steps of:

converting said spoken utterances into a plurality of digitized voice data segments;

populating said digitized voice data segments with non-spoken digital data;

alternatively storing said plurality of digitized voice data segments in first and second buffers;

transmitting said digitized voice data segments alternately from said first and second buffers between said first computer and said second computer over said computer communication medium, said transmitter transmitting a first one of said digitized voice data segments from said first buffer while said second buffer is being filled with a second one of said digitized voice data segments, and transmitting said second one of said digitized voice data segments from said second buffer while said first buffer is being filled with a third one of said digitized data segments;

receiving said transmitted digitized voice data segments substantially in real time; and controlling the playing back of said transmitted digitized voice data segments such that said segments are played back substantially in real time.

7. The Method of claim 6 wherein said computer communication medium comprises a local area network.

8. The Method of claim 7 wherein said computer communication medium comprises a wireless local area network.

9. The Method of claim 7 wherein said computer communication medium comprises a wired local area network.

10. The method of claim 6, wherein said step of receiving said transmitted digitized voice data comprises the steps of:

filling a third buffer with said received digitized voice data;

when said third buffer is full, placing said received digitized voice data in a fourth buffer; and alternately transferring the contents of said third and fourth buffers to a playback device.

11. A method for transmitting spoken utterances substantially in real time between a first computer and a second computer over a computer communication medium, said computer communication medium communicating digitized voice data and non-spoken digital data, said first computer having a recorder for recording said spoken utterances and said second computer having a playback device for playing back transmitted spoken utterances, said method comprising the steps of:

converting said spoken utterances into digitized voice data;

populating said digitized voice data with non-spoken digital data;

segmenting said digitized voice data and said non-spoken digital data into a plurality of digitized voice data segments as said spoken utterances are received by said recorder;

filling a first buffer with a first quantity of said digitized voice data segments;

when said first buffer is filled, then filling a second buffer with a second quantity of said digitized voice data segments;

while said second buffer is being filled, transmitting the contents of said first buffer from said first computer to said second computer over said computer communication medium;

when the contents of said first buffer have been transmitted, filling said first buffer with a third quantity of said plurality of digitized voice data segments;

alternately transmitting the contents of said first and second buffers to said second computer over said computer communication medium;

using a third buffer to store said first quantity of transmitted digitized voice data segments;

when said third buffer is full, using a fourth buffer to store said second quantity transmitted of digitized voice data segments; and alternately converting the contents of said third and fourth buffers back into spoken data segments.

* * * * *